United States Patent [19]
Aota et al.

[11] Patent Number: 5,495,127
[45] Date of Patent: Feb. 27, 1996

[54] ENGINE STARTING APPARATUS FOR VEHICLES

[75] Inventors: Hiroyuki Aota, Kariya; Hiroshi Tashiro, Nagoya; Takaji Murakawa, Kariya; Toyoji Yagi, Anjo, all of Japan

[73] Assignee: Nippondenso Co., Ltd., Kariya, Japan

[21] Appl. No.: 299,364

[22] Filed: Sep. 1, 1994

[30] Foreign Application Priority Data

Sep. 2, 1993 [JP] Japan .................................. 5-218682
Nov. 5, 1993 [JP] Japan .................................. 5-276863

[51] Int. Cl.$^6$ ........................... H02K 23/52; B60L 11/02
[52] U.S. Cl. .................. 290/31; 290/10; 290/22; 290/38 R; 290/46
[58] Field of Search ................. 290/10, 22, 31, 290/38 R, 46; 123/179.1, 179.3, 179.28

[56] References Cited

U.S. PATENT DOCUMENTS 2,662,986 12/1953 Vintenon ................. 290/38 R
4,490,620 12/1984 Hansen ..................... 290/38 R
4,862,010 8/1989 Yamamoto ................ 290/38 R

FOREIGN PATENT DOCUMENTS

374584 4/1992 European Pat. Off. .
297300 4/1900 Japan .
5223042 8/1993 Japan .

Primary Examiner—Clayton E. LaBalle
Assistant Examiner—Christopher Cuneo
Attorney, Agent, or Firm—Cushman, Darby & Cushman

[57] ABSTRACT

Disclosed is an engine starting apparatus which suppresses engine vibrations and noises during engine cranking and reduces consumption of electric power supplied for engine cranking. When an engine starts to rotate to produce its torque, electric power supplied to a starter motor for engine cranking is reduced gradually so that a sum of torques produced by the starter motor and the engine may be prevented from increasing excessively. In the case a generator/motor is used for engine starting, operation of the generator/motor is switched from motor operation to generator operation for suppressing excessive speed rise when engine starting is completed.

15 Claims, 8 Drawing Sheets

ENGINE STARTING APPARATUS FOR VEHICLES

BACKGROUND OF THE INVENTION

1. Field of the Invention

The present invention relates to an engine starting apparatus for vehicles, and more particularly to an apparatus which assures quiet engine starting with comparatively short engine starting period.

2. Related Art

In a conventional engine starting apparatus for vehicles, a starter motor for cranking a vehicle-mounted engine is energized when an ignition switch is turned on and deenergized when a rotational speed of the engine attains a predetermined speed.

In another conventional engine starting apparatus for vehicles such as disclosed in JP-A-2-97300, an electric generator/motor is used to perform a motor operation for cranking an engine and thereafter switched to perform a power generator operation. During the power generation operation, exciting current to the generator/motor for power generation is kept to a minimum value until the engine is warmed up so that the engine is prevented from stalling.

In the above-described engine starting or cranking operation, it is desired to crank the engine with as large torque as possible to speedily start the engine by overcoming its large load resistance including static friction at the time of initial period of engine starting.

In the last period of engine starting after the engine is started to rotate, the engine starts to produce a driving torque and frictions at various friction surfaces in the engine changes from the static one to the dynamic one to reduce the load resistance. As a result, the rotational speed of the engine increases rapidly and large vibrations and noises are generated, thus degrading quietness and durability of the engine.

Further, applying a large torque from the generator/motor to the engine to rapidly increase its rotational speed after the starting of engine rotation causes unnecessary consumption of electric power in a vehicle-mounted storage battery.

SUMMARY OF THE INVENTION

It is therefore a primary object of the invention to obviate the above described drawbacks.

It is a further object of the present invention to provide an engine starting apparatus which enables quiet engine starting while assuring fast engine starting.

It is a still further object of the present invention to provide an engine starting apparatus which reduces consumption of electric power at the time of engine starting.

According to a first aspect of the present invention, an internal combustion engine mounted on a vehicle is started or cranked by an electric starter motor and an electric power supply to the starter motor is reduced gradually after the engine starts to rotate. When the engine starts to rotate to produce a driving torque, a sum of torques of the starter motor and the engine is prevented from increasing excessively by the reduction in the electric power to the starter motor. As a result, excessive rise in rotational speed of the engine is suppressed in an engine starting period after the rise in the rotational speed, thus reducing engine vibrations and improving engine durability.

Though the torque from the starter motor is reduced after the rise in the rotational speed, it is continued to be applied to the engine and hence the rotational speed is not increased excessively but is increased stably to assure the engine starting without causing engine stall. Further, electric power consumption is also reduced during the starting period after the rise in the engine rotational speed.

According to a second aspect of the present invention, after starting an engine by a motor operation of a generator/starter is completed (attainment of a predetermined speed, for instance), an excessive rise (overshooting) in an engine rotational speed is detected and thereafter the generator/motor is switched to the generator operation to suppress the overshooting.

This arrangement is effective to reduce engine vibrations and noises, improve engine durability and restore to a storage battery electric energy generated in the generator operation.

DETAILED DESCRIPTION OF THE PRESENTLY PREFERRED EMBODIMENT

The present invention will now be described in more detail with reference to embodiments illustrated in the accompanying drawings.

Figure 1:
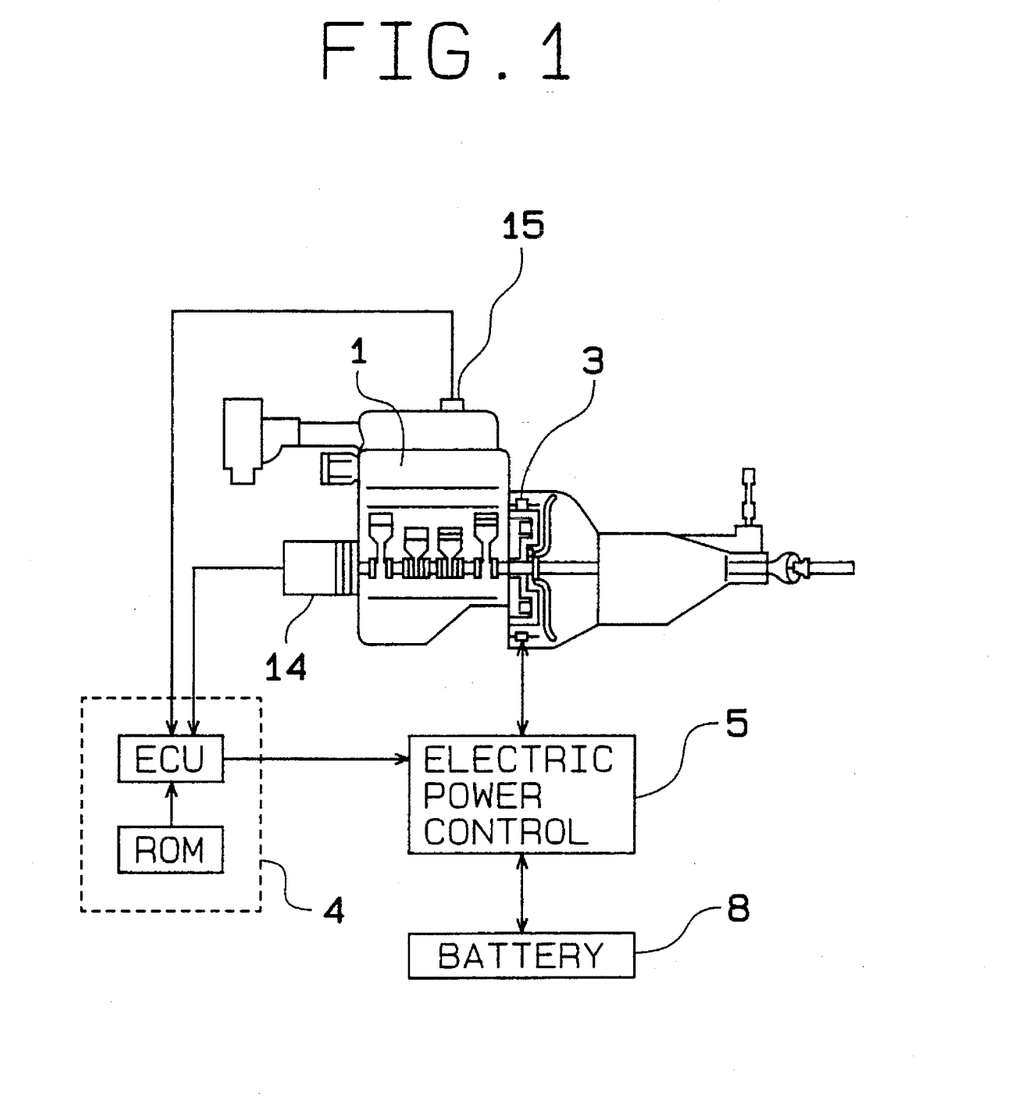
FIG. 1 is a schematic view of an embodiment of an engine starting apparatus according to the present invention.

As illustrated in FIG. 1 an engine starting apparatus includes generator/motor 3 torque transferably coupled to a crankshaft of vehicle-mounted internal combustion engine 1 and connected to storage battery 8 through electric power control unit 5. Generator/motor 3 has electric power generating function (generator operation) and electric motor function (motor operation) in which electric power is supplied from and to storage battery 8, respectively. Control unit 5 switches the generator operation and motor operation and controls an energization current to generator/motor 3 as described hereinunder. Electronic controller 4 including ECU (electronic control unit) and ROM (read only memory) and other circuit devices is connected to power control unit 5 to control the same in accordance with operating conditions of engine 1. In this embodiment, electronic controller 4 receives signals from crank angle sensor 14 and temperature sensor 15 as engine operating conditions for engine starting control.

Figure 2:
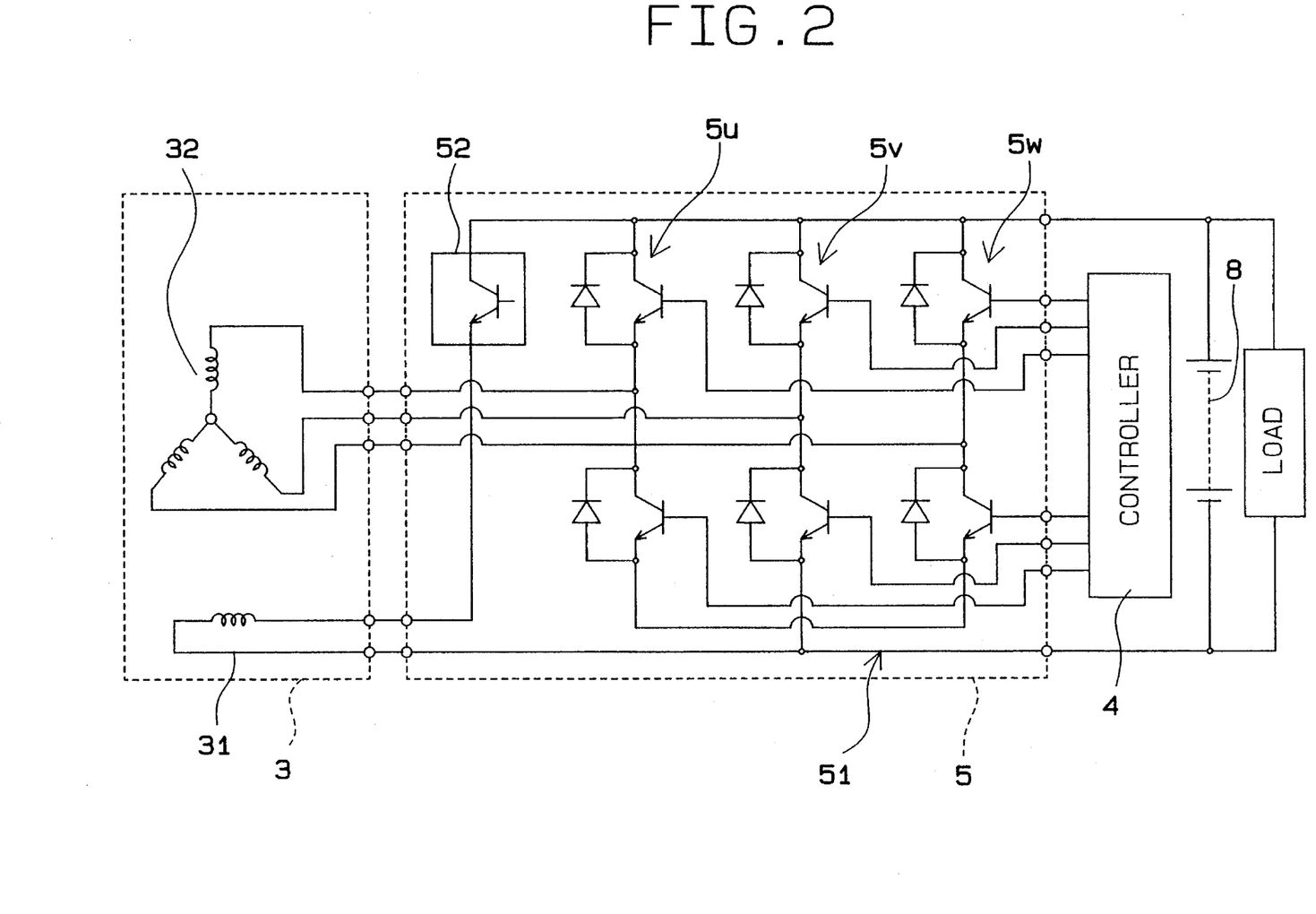
FIG. 2 is an electric wiring diagram of the embodiment illustrated in FIG. 1.

Electric circuit construction of the generator/motor 3 and power control unit 5 is illustrated in FIG. 2.

Generator/motor (used as starter motor) 3 is a three-phase synchronous type, and it has exciting coil 31 wound on a rotor core (not shown) and three-phase star-connected armature coil 32 wound on a stator core (not shown).

Power control unit 5 comprises three-phase inverter circuit 51 which is ON-OFF controlled in accordance with crank angle position of engine 1 and transistor 52 for switching on and off the energization current. Three-phase inverter circuit 51 includes inverters 5u, 5v and 5w each of which has a pair of NPN type transistors or IGBT (insulated gate bipolar transistor) connected in series for each phase. Inverters 5u, 5v and 5w are connected across storage battery 8 to which electric load such as radio is connected and each transistor is connected in parallel to a diode. Output terminals of inverters 5u, 5v and 5w are connected to output terminals of three-phase armature coil 32, respectively.

Exciting coil 31 is connected at its one end and the other end to a negative terminal of battery 8 directly and positive terminal of battery 8 through transistor 52, respectively.

Power control unit 5 is so designed as to control switching timings of the transistors in inverter circuit 51 for thereby switching operation mode of generator/motor 3 between generator operation and motor operation and to control switching on and off energization current for controlling transistor 52 thereby controlling duty ratio of the exciting current of generator/motor 3. This is known well in the art and no further description will be made for brevity. It will be understood that, by this control, generator/motor 3 is conditioned to motor operation and generator operation to thereby apply and receive torque to and from engine 1 and to thereby receive and supply electric power from and to storage battery 8, respectively.

Figure 3:
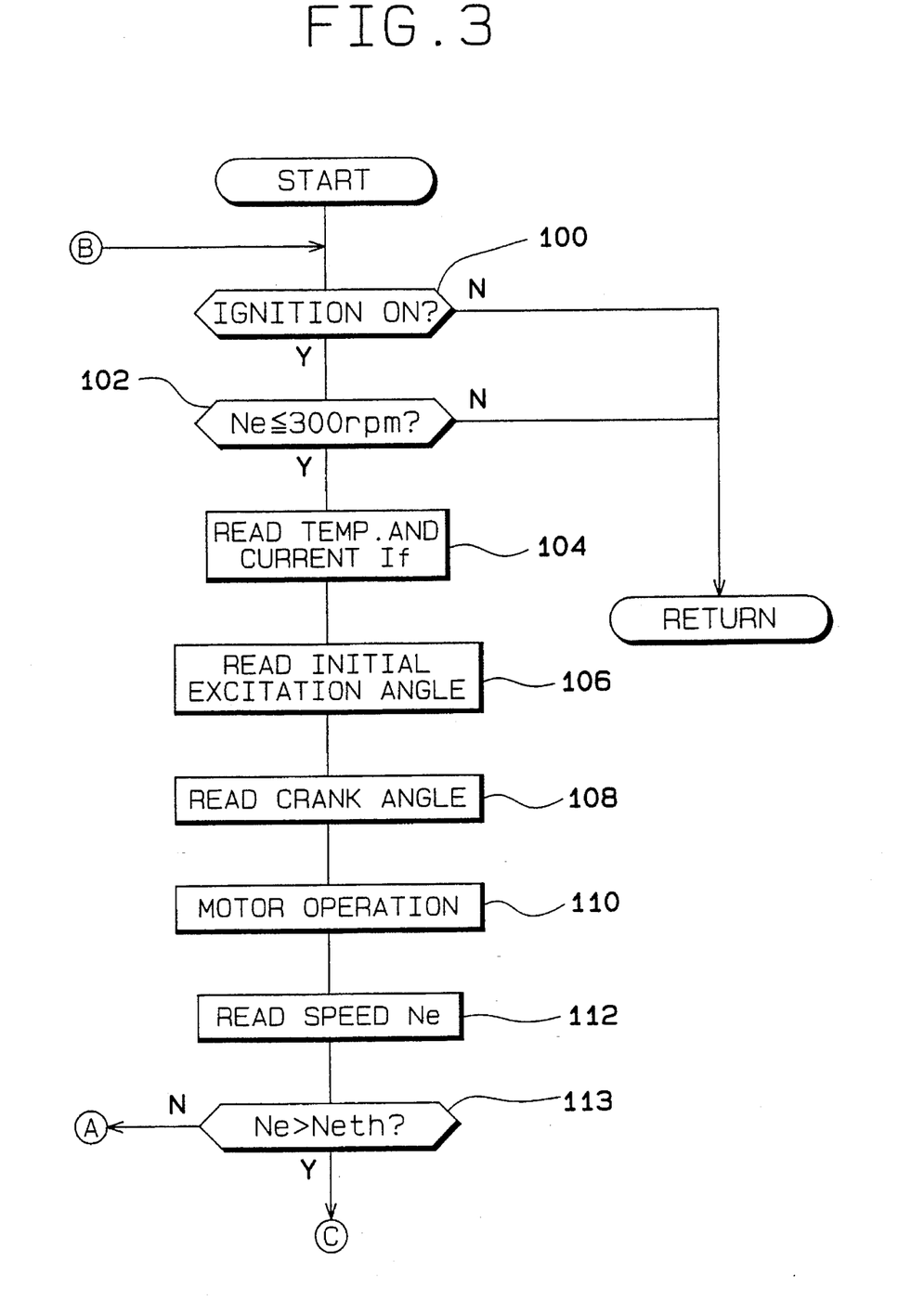
FIGS. 3 through 5 are flow charts illustrating operation processes of the embodiment of FIG. 1.
Figure 4:
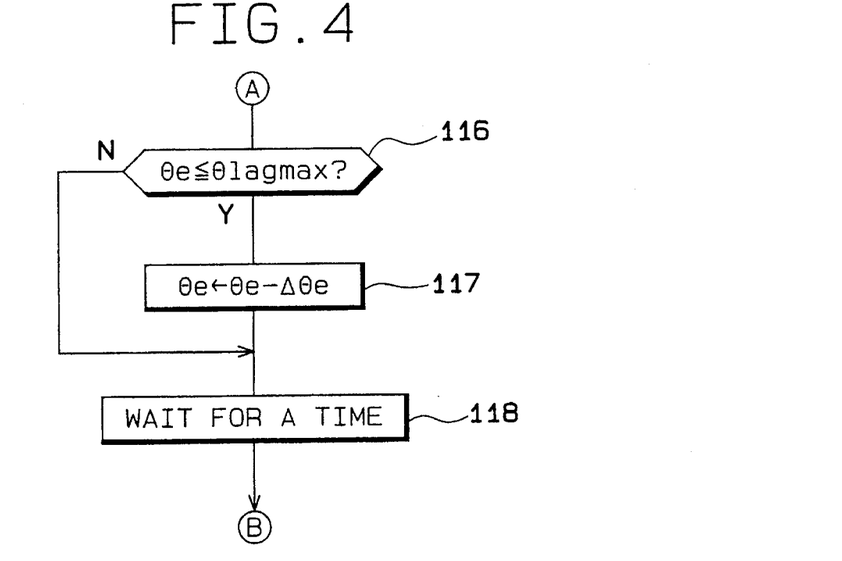
Figure 5:
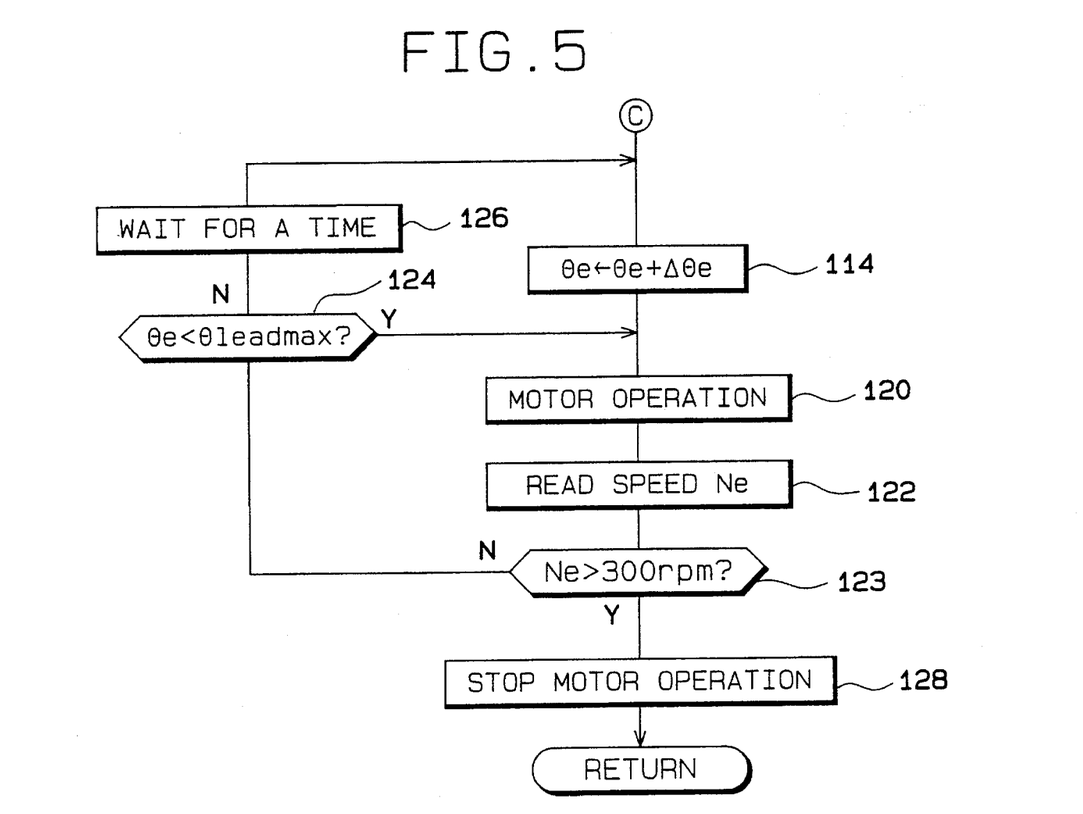

Operation of the above embodiment primarily performed by electronic control unit 4 and power control unit 5 will be described in detail with further reference to flow charts in FIGS. 3 through 5.

After the electric power supply to controller 4 including ECU is started, it is determined at step 100 whether an ignition switch (not shown) is turned on for engine operation. If the determination is NO, processing returns to main routine (not shown) and, after a certain time lapse, step 100 is performed again.

If the determination is YES at step 100, it is determined at step 102 whether engine rotational speed Ne calculated from an output of crank angle sensor 14 is below 300 rpm, and processing returns to the main routine in the event of determination NO indicative of high enough rotational speed.

If the determination at step 102 is YES, temperature of the coolant detected by temperature sensor 15 is read and the exciting current value If corresponding to the read temperature is read from mapped data in ROM at step 104. Further, Initial value of electric excitation angle Θe for initial engine starting is read from mapped data in ROM. The mapped data of excitation current If is primarily stored to compensate for temperature-dependent changes in load resistance of engine 1 and power supply capacity of storage battery 8. The duty ratio of the exciting current If is increased as the coolant temperature decreases so that generator/motor 3 is energized more as the coolant temperature is lower. Electric excitation angle Θe means a phase angle between a vector (rotational vector) of each pole piece of the rotor core fixedly mounted on a predetermined angular position and a vector (rotational vector) of a predetermined phase voltage (u-phase voltage Vu, for instance) among the three-phase armature voltages. It is to be noted that in this description the electric excitation angle Θe is defined as a crank angular position at which u-phase voltage Vu is turned on (on-timing). Now that the number of poles of generator/motor 3 and on-timing of u-phase voltage Vu are fixed, off-timing of u-phase voltage Vu and both on-timings and off-timings of the other v-phase and w-phase voltages Vv and Vw will be determined subsequently.

Next at step 108, crank position or angle angle Θ detected by sensor 14 is read and motor operation of generator/motor 3 is instructed at step 110. That is, each transistor in three-phase inverter circuit 51 is switching-controlled at the above described on and off timings based on angle Θ as a reference.

At step 112, engine rotational speed Ne (or angular velocity ω) is read and, at step 113, it is compared with predetermined threshold speed Neth (200 rpm) which represents sufficient rise of rotational speed in engine starting. If the comparison result is YES, it is determined that the engine starting is successful or engine 1 has started rotation and processing moves to step 114 of FIG. 5.

If the determination at step 113 is NO, it is considered that the engine starting is not successful yet and processing moves to step 116 in FIG. 4 to determine whether current electric excitation angle Θe is equal to or below maximum lag (retard) value Θlagmax. If the determination is NO, step 118 is performed to wait for a predetermined period before returning to step 100. If the determination at step 116 is YES, angle Θe is delayed by an amount ΔΘe at step 117 and step 118 is performed. This delay or retard in excitation angle Θe means changing excitation angle Θe towards a direction which increases driving torque of generator/motor 3 for faster engine starting (see FIG. 7). Here, maximum value Θlagmax means excitation angle which causes generator/motor 3 to produce maximum driving torque as the starter motor.

Steps 116 through 118 may be omitted, if waiting is made at step 113. In this instance, it is preferred to set excitation angle Θe to maximum retard value for fastest engine starting.

On the contrary, if the determination at step 113 is YES indicating that engine started to rotate by itself or engine starting is almost completed, excitation angle Θe is advanced by an amount ΔΘe at step 114 to reduce its output torque (see FIG. 7) and motor operation is continued to be performed at step 120 so that each transistor in three-phase inverter circuit 51 is switched on and off at the timings determined most lately. This advance in angle means changes in electric excitation angle Θe towards a direction to decrease the driving torque produced in the motor operation of generator/motor 3.

Thereafter, rotational speed Ne is read at step 122 and it is compared with the threshold speed, ram, at step 123. If the comparison result is YES (Ne>ram), it is determined that engine starting is completed and energization of generator/motor 3 is stopped to stop motor operation at step 128. If the comparison result at step 123 is NO indicating incomplete engine starting, it is determined at step 124 whether excitation angle Θe is below maximum lead angle Θleadmax. If the determination is NO, it is waited for a time at step 126 before returning to step 114 in which excitation angle Θe is further increased. If the determination at step 124 is YES, on the contrary, motor operation is performed at step 120. It is to be understood that this advance means changing excitation angle Θe in the direction to decrease driving torque produced in motor operation of generator/motor 3. Maximum advance angle Θleadmax means the excitation angle which causes generator/motor 3 to produce minimum driving torque.

Steps 124 and 126 may be omitted, if waiting is made at step 123. In this instance, it is preferred to set excitation angle Θe to a predetermined value at step 114.

As described hereinabove, since electric excitation angle Θe of generator/motor 3 is advanced as soon as engine 1 starts rotation (Ne≧Neth), electric power supply from battery 8 to generator/motor 3 for motor operation can be reduced.

In three-phase synchronous motor, effective electric power may be controlled by control of excitation angle Θe. In the above embodiment, excitation angle Θe is advanced and retarded at every predetermined interval by steps 118 and 126, it may be done so without any waiting period.

Figure 6:
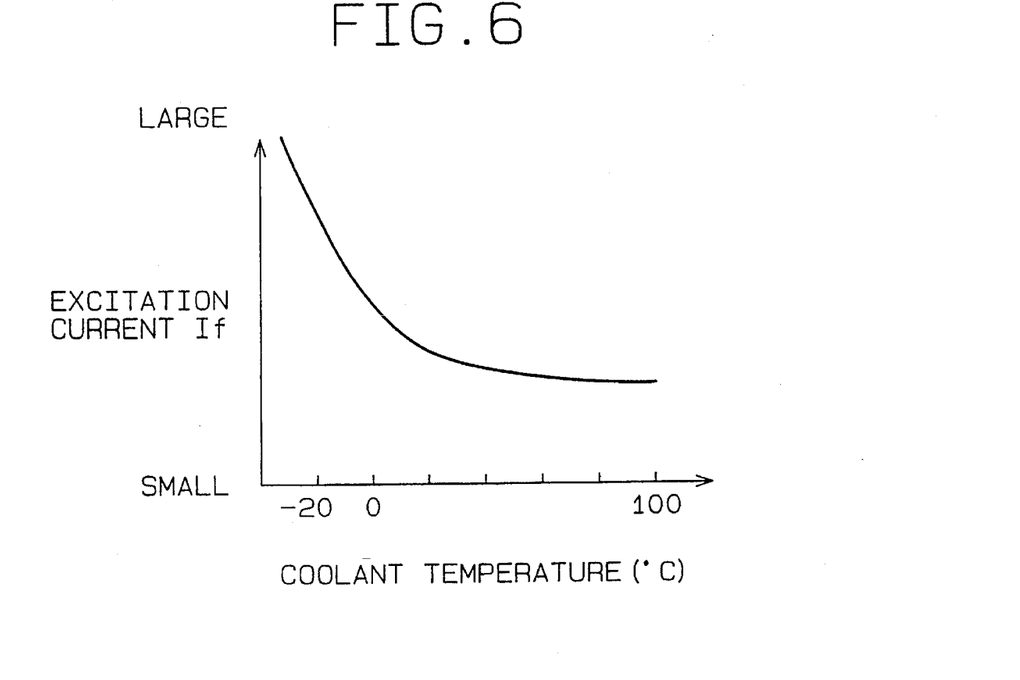
FIG. 6 is a graph illustrating a relation between a coolant temperature and an energization current.
Figure 7:
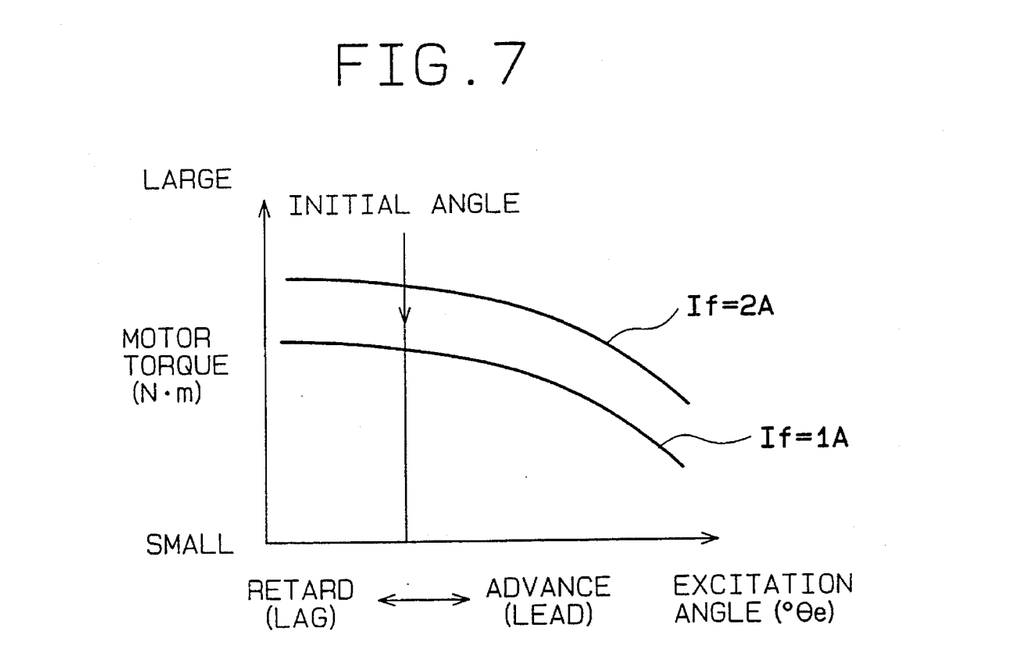
FIG. 7 is a graph illustrating a relation between an electric excitation angle and a driving torque.

For better understanding the operation of the embodiment, mapped data representing relation between engine coolant water temperature and excitation current If is illustrated in FIG. 6, and the relation between excitation angle Θe and driving torque produced by generator/motor 3 is illustrated in FIG. 7.

Figure 8:
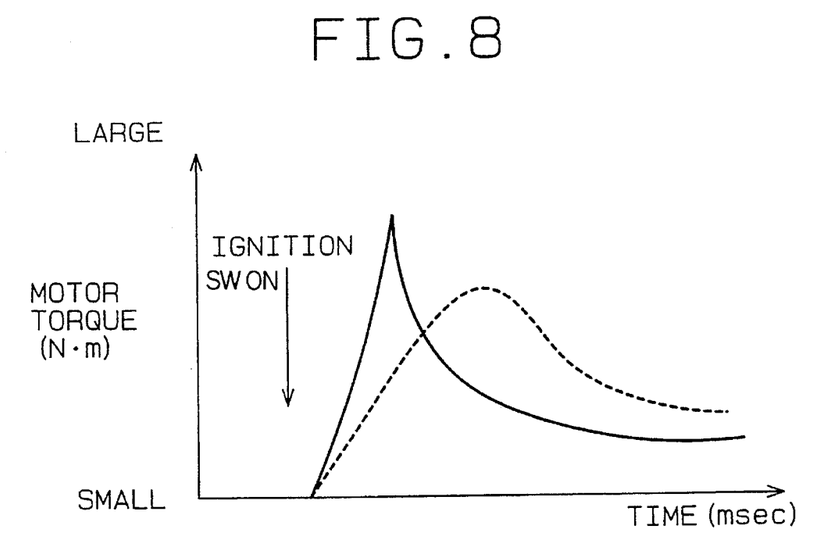
FIG. 8 is a time chart illustrating a driving torque change in the embodiment of FIG. 1 in comparison with the conventional apparatus.
Figure 9:
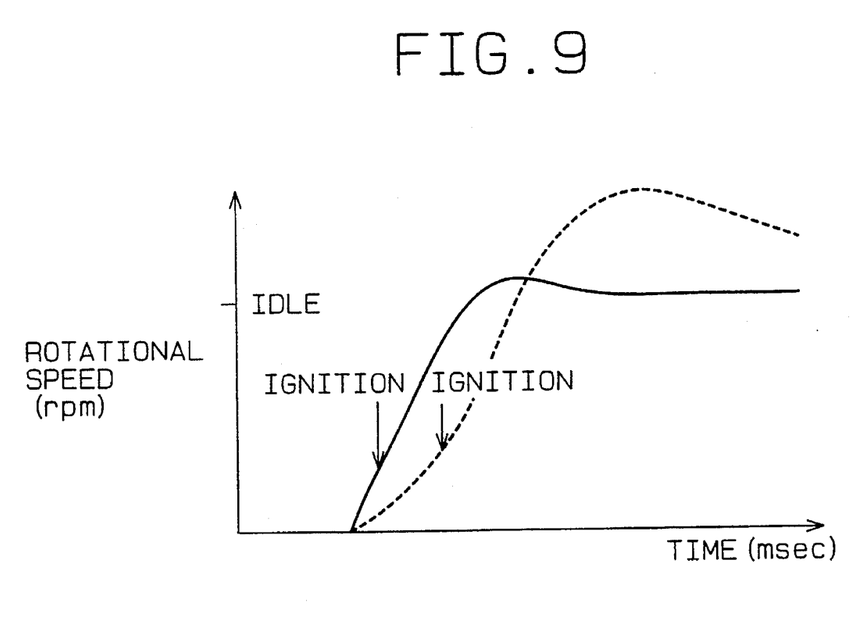
FIG. 9 is a time chart illustrating a rotational speed change in the embodiment of FIG. 1 in comparison with the conventional apparatus.

Further, the time-change of driving torque produced by generator/motor 3 according to the present embodiment is illustrated by the solid line in FIG. 8 in comparison with that in the prior art (dotted line), and the time-change of rotational speed of engine 1 is illustrated by the solid line in FIG. 9 in comparison with that in the prior art (dotted line).

In the above-described embodiment, it should be understood that step 113 is for detecting start of engine rotation and step 114 is for reducing excitation current in the motor operation.

Next, another embodiment of the present invention is described.

A second embodiment is directed to the apparatus in which reduction in electric power supply to generator/motor 3 is performed not by advancing excitation angle Θe but by reducing energization current If and it is mostly the same as the above described embodiment except for a few modifications. That is, step 116 in FIG. 4 is modified to determine whether exciting current If is above maximum exciting current Ifmax or not, step 117 of FIG. 4 is modified to increase exciting current If by an amount ΔIf, step 114 in FIG. 5 is modified to decrease exciting current If by an amount ΔIf, and step 124 in FIG. 5 is modified to determine whether exciting current If is above minimum exciting current Ifmin or not.

A further embodiment is described with reference FIG. 10.

In this further embodiment, excessive rise (overshooting) in rotational speed of engine 1 is detected immediately after completion of engine starting by generator/motor 3, that is, after the engine speed reaches idling speed Nd, and upon detection of the overshooting generator/motor 3 is switched to generator operation to suppress the overshooting.

First, rotational speed Ne is read at step 129 and it is compared with idling speed Nd (Nd=650 rpm, for instance) at step 130. If the comparison result is NO, the above processing is repeated. If the comparison result is YES, on the other hand, it is determined whether time lapse from turning on the ignition switch is within a predetermined time (1 sec., for instance) at step 131. If the determination is YES, it is considered that it is just after the completion of engine starting and initiates generator operation of generator/motor 3 at step 132. Thereafter, it is determined further at step 133 whether another predetermined time (50 ms, for instance) has passed after the start of generator operation. If the determination is NO, it is considered that engine 1 is in the excessive speed rise condition just after the completion of the engine starting and processing returns to step 129. If the determination at step 131 is NO or the determination at step 133 is YES, it is considered that the engine is not in the excessive speed rise condition just after the completion of engine starting and processing returns to the main routine.

Figure 10:
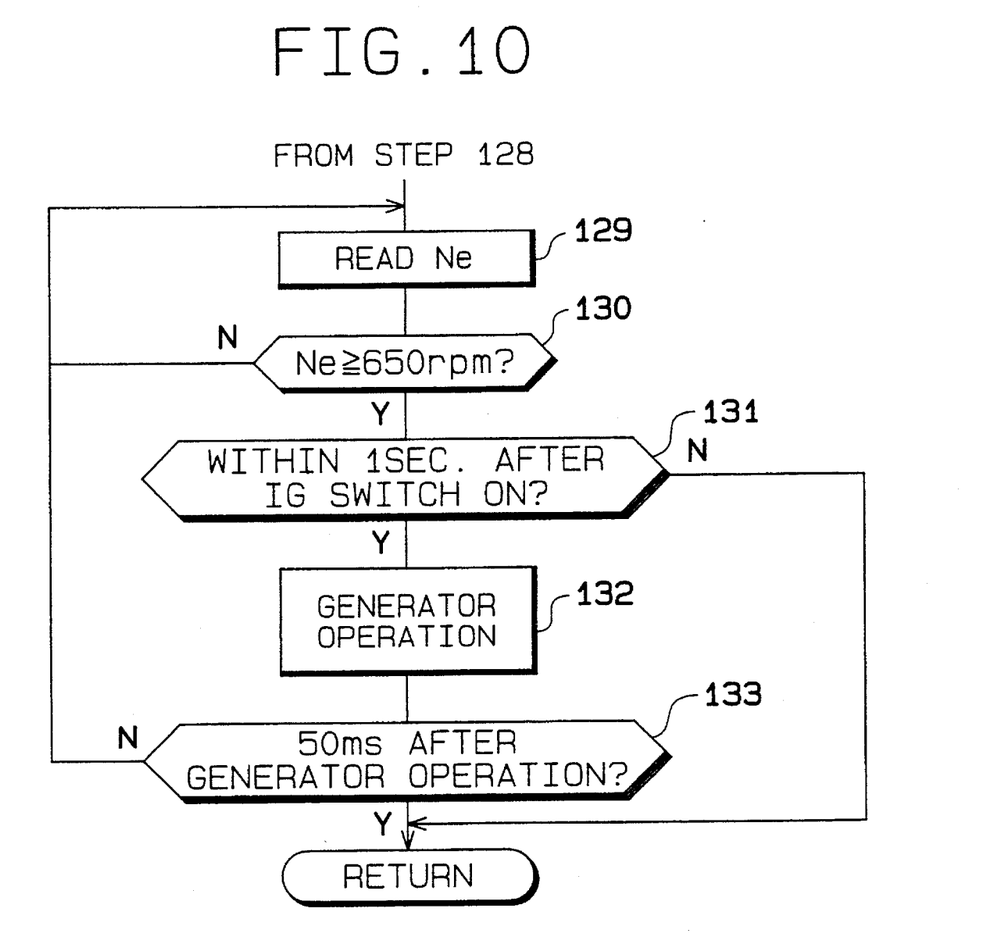
FIG. 10 is a flow chart illustrating a part of operation processes of a further embodiment of the present invention.
Figure 11:
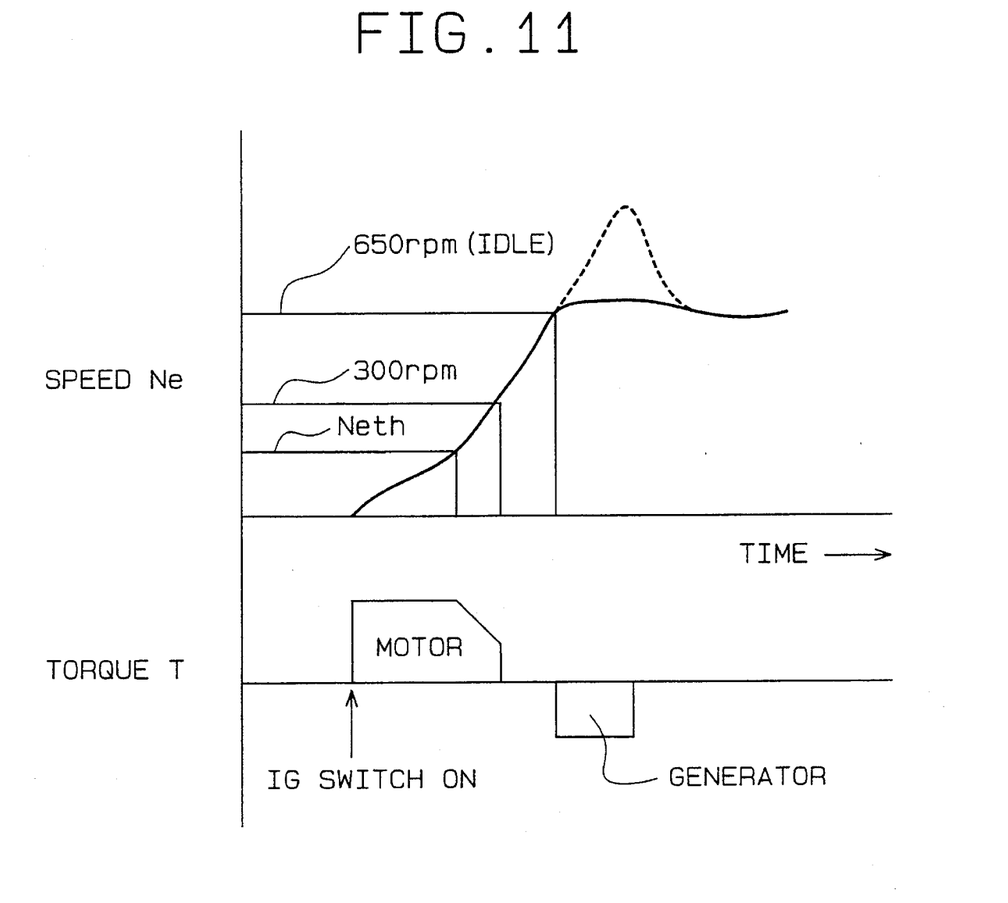
FIG. 11 is a chart illustrating a rotational speed change and a torque change in the further embodiment of FIG. 10 in comparison with the conventional apparatus.

Time-changes in rotational speed Ne immediately after the engine starting and time-changes in the torque of generator/motor 3 in the embodiment of FIG. 10 is illustrated in FIG. 11.

By this control, excessive speed rise (overshooting) which will occur immediately after completion of engine starting can be suppressed effectively by generator operation, and reduction in vibrations and noises of engine, improvement of durability of engine and electric energy saving can be attained.

Though the excessive speed rise (overshooting) just after the completion of engine starting is detected by detecting engine idling speed (step 130) in the above described embodiment, it may be modified to determine the occurrence of excessive speed rise (overshooting) after the completion of engine starting when a predetermined time passes after the engine rotational speed rises to a predetermined speed (motor operation start speed, rpm, for instance).

Though the generator operation for suppressing the excessive speed rise is stopped by the time lapse at step 133, it may be modified to stop the generator operation by detecting the engine rotational speed falling below a predetermined value.

The foregoing description of the present invention is only for presently preferred embodiments only, and the present invention should not be restricted to the above embodiments but may be modified in many other ways without departing from the spirit and concept of the present invention.

We claim:

1. A starting apparatus for an engine comprising:

a generator/motor capable of starting an engine by motor operation when energized by energization current and generating electric power by generator operation when driven by said engine;

a crank angle sensor for detecting crank angle of said engine;

a power control unit for switching operational mode of said generator/motor between said motor operation and said generator operation and for controlling torque generated by said motor operation of said generator/motor; and controller for controlling said power control unit in response to said crank angle detected by said crank angle sensor, wherein said controller includes:

first means for instructing to said control unit so that said motor operation of said generator/motor is performed when a rotational speed of said engine is below a first predetermined value;

second means for instructing to said control unit so that torque generated by said motor operation is gradually reduced when said rotational speed of said engine reaches a second predetermined value lower than said first predetermined value; and third means for instructing said control unit so that said motor operation of said generator/motor is terminated when said rotational speed is above said first predetermined value.

2. A starting apparatus for an engine according to claim 1, further comprising:

a temperature sensor for detecting coolant temperature of said engine, and wherein said controller further includes:

fourth means for varying said torque of said motor operation in accordance with said coolant temperature of said engine.

3. A starting apparatus for an engine according to claim 1, wherein said controller further includes:

fifth means for instructing to said power control means so that said torque generated by said motor operation is gradually increased when said rotational speed is below said second predetermined value.

4. A starting apparatus for an engine comprising:

a generator/motor capable of starting an engine by motor operation when energized by energization current and generating electric power by generator operation when driven by said engine;

speed detecting means for detecting a rotational speed of said engine;

a power control unit for switching operational mode of said generator/motor between said motor operation and said generator operation; and controller for controlling said power control unit in response to said rotational speed detected by said speed detecting means, wherein said controller controls said power control unit so that said generator operation of said generator/motor is performed for a predetermined time period when said rotational speed of said engine reaches a predetermined value immediately after completion of said engine starting by said motor operation.

5. An engine starting apparatus comprising:

motor means for applying torque to an engine when energized to start said engine;

speed detecting means for detecting a rotational speed of said engine; and electric power control means for controlling torque generated by said motor means, said control means reducing said torque of said motor means when said detected engine speed rises to a first predetermined speed.

6. An engine starting apparatus according to claim 5, wherein said control means stops energization of said motor means when said detected engine speed rises to a second predetermined speed higher than said first predetermined speed.

7. An engine starting apparatus according to claim 5, wherein said torque of said motor operation is varied in accordance with a coolant temperature of said engine and a crank angle of said engine.

8. An engine starting apparatus according to claim 5, wherein said motor means includes generator/motor which performs motor operation to produce torque when energized and generator operation when applied with torque from said engine.

9. An engine starting apparatus according to claim 8, wherein said generator/motor is switched to said generator operation when said detected engine speed rises to an idling speed.

10. An engine starting apparatus according to claim 9, wherein said control means stops energization of said generator/motor when said detected engine speed rises to a predetermined speed lower than said idling speed.

11. An engine starting apparatus according to claim 9, wherein said generator operation is limited to a first predetermined time period from initiation of said generator operation.

12. An engine starting apparatus according to claim 9, wherein said generator operation is disabled after a second predetermined time period has passed after turning on of an ignition switch.

13. A starting apparatus for an engine comprising:

a generator/motor capable of starting an engine by motor operation when energized by energization current and generating electric power by generator operation when driven by said engine;

speed detecting means for detecting a rotational speed of said engine;

a power control unit for switching operational mode of said generator/motor between said motor operation and said generator operation; and controller for controlling said power control unit in response to said rotational speed detected by said speed detecting means, wherein said controller includes:

first means for stopping said motor operation when said rotational speed reaches a first predetermined value before the starting of said engine has completed; and second means for performing said generator operation for a predetermined time when said rotational speed reaches a second predetermined value which is higher than said first predetermined value, if a predetermined time period has not passed since said engine began to start.

14. A starting apparatus for an engine according to claim 13, wherein said controller controls said power control unit so that said power control unit gradually reduces torque in said motor operation when said rotational speed rises to a third predetermined value which is lower than said first predetermined value.

15. A starting apparatus for an engine according to claim 13, wherein said power control unit controls torque of said motor operation in accordance with a coolant temperature of said engine.

* * * * *